(12) United States Patent
Wang et al.

(10) Patent No.: US 12,003,528 B1
(45) Date of Patent: Jun. 4, 2024

(54) ENDOGENOUS DYNAMIC DEFENSE ARCHITECTURE-BASED MULTI-OBJECTIVE SERVICE FUNCTION CHAIN DEPLOYMENT METHOD

(71) Applicant: NANJING UNIVERSITY OF AERONAUTICS AND ASTRONAUTICS, Nanjing (CN)

(72) Inventors: Ran Wang, Nanjing (CN); Qiang Wu, Nanjing (CN); Qi Zhu, Nanjing (CN); Jie Hao, Nanjing (CN); Xue Yu, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 18/581,424

(22) Filed: Feb. 20, 2024

(30) Foreign Application Priority Data

Mar. 9, 2023 (CN) .......................... 202310223837.1

(51) Int. Cl.
  *H04L 9/40* (2022.01)
(52) U.S. Cl.
  CPC ...... *H04L 63/1433* (2013.01); *H04L 63/1441* (2013.01)
(58) Field of Classification Search
  CPC . H04L 63/1433; H04L 63/1441; H04L 63/20; G06F 21/577; G06F 2212/1052
  See application file for complete search history.

(56) References Cited

U.S. PATENT DOCUMENTS 10,440,048 B1 * 10/2019 Li ........................ H04L 63/1441
2012/0303924 A1 * 11/2012 Ross ........................ G06F 7/58
  711/170

(Continued)

FOREIGN PATENT DOCUMENTS

CN   109491668 A   3/2019
CN   109525418 A   3/2019

(Continued)

OTHER PUBLICATIONS

Izadi et al., "Enhancing Network Security Through Moving Target Defense Technology: An Analysis of the Impact on Attack Level," 2023 7th International Conference on Internet of Things and Applications (IoT) Year: 2023 | Conference Paper | Publisher: IEEE.*

(Continued)

*Primary Examiner* — Roderick Tolentino
(74) *Attorney, Agent, or Firm* — CBM Patent Consulting, LLC

(57) ABSTRACT

An endogenous dynamic defense architecture-based multi-objective service function chain deployment method solves a problem of multi-objective deployment by constructing an endogenous dynamic defense architecture, in which a basic mode includes using moving target defense to ensure the security of VNFs, and an enhanced mode includes using mimic defense to perform security protection on the VNFs; in a construction module, a sub-pool division algorithm is proposed to divide a heterogeneous replica pool into a plurality of sub-pools, and VNFs are selected from the sub-pools so as to constitute a heterogeneous replica set; in a scheduling module, a replica VNF dynamic scheduling deployment algorithm is proposed, a deployment set is selected from the heterogeneous replica set for deployment, and is sent to a processing module; the input module replicas an input and distributes same to the processing module.

3 Claims, 13 Drawing Sheets

(56) References Cited

U.S. PATENT DOCUMENTS

| | | | | |
|---|---|---|---|---|
| 2013/0326625 A1* | 12/2013 | Anderson | ............. | G06F 21/566 726/23 |
| 2016/0285913 A1* | 9/2016 | Itskin | ...................... | H04L 45/74 |
| 2017/0024261 A1* | 1/2017 | Atluri | ................... | G06F 9/5088 |
| 2017/0104780 A1* | 4/2017 | Zaffarano | ............... | H04L 63/20 |
| 2018/0332073 A1* | 11/2018 | Ahmed | ................. | G06F 9/4881 |
| 2019/0190955 A1* | 6/2019 | Khan | ..................... | H04L 63/20 |
| 2022/0164441 A1* | 5/2022 | Cohen | ..................... | G06F 21/54 |
| 2022/0215094 A1* | 7/2022 | Gupta | ................. | H04L 63/1441 |

FOREIGN PATENT DOCUMENTS

| | | |
|---|---|---|
| CN | 109587168 A | 4/2019 |
| CN | 109842528 A | 6/2019 |
| CN | 111163070 A | 5/2020 |
| CN | 111866038 A | 10/2020 |
| CN | 112822192 A | 5/2021 |
| CN | 115001831 A | 9/2022 |

OTHER PUBLICATIONS

Chen et al., "Design and Implementation of A Vulnerability-Tolerant Reverse Proxy Based on Moving Target Defense for E-Government Application," 2021 2nd Information Communication Technologies Conference (ICTC) Year: 2021 | Conference Paper | Publisher: IEEE.*

Jinglei Tan, Hongqi Zhang, Cheng Lei, Xiaohu Liu and Shuo Wang "SDN-oriented Moving Target Protection Technology Research Progress" Journal of Network and Information Security 07: 1-3 Publication Date:Jul. 15, 2018.

Jichao Xie, Peng Yi, Zheng Zhang, Chuanhao Zhang, and Yunjie Gu "Service Functional Chain" Journal of Network and Information Security 06: 1-3 Publication Date:May 15, 2018.

* cited by examiner

ENDOGENOUS DYNAMIC DEFENSE ARCHITECTURE-BASED MULTI-OBJECTIVE SERVICE FUNCTION CHAIN DEPLOYMENT METHOD

CROSS-REFERENCE TO RELATED APPLICATION

This application claims priority to Chinese Patent Application Ser. No. CN202310223837.1 filed on 9 Mar. 2023.

TECHNICAL FIELD

The present invention relates to a service function chain orchestration technology, in particular to an endogenous dynamic defense architecture-based multi-objective service function chain deployment method.

BACKGROUND

The introduction of the concepts of virtualization, IT, and software enables the 5G network to have flexibility, programmability and intelligentization, and also provides a novel manner for designing, orchestrating and deploying various mobile services to support increasingly complex and variable customer requirements, so that the network service deployment is more flexible and quick. As a virtualization technology, the NFV deploys software network functions on a stable commercial computing resource platform, which avoids complex connection and configuration works in a traditional heterogeneous hardware network function deployment process, and effectively solves the problems of high device price, difficulties in management, and high failure rate caused by connection configuration, network traffic overload, etc. existing in traditional network function hardware devices in combination with flexible management mechanisms such as load balancing. SDN is a novel method for designing, implementing and managing networks, which decouples network control management (control plane) from a data forwarding process (data plane), so as to obtain good user experience. The separation of network control and data provides many benefits for flexibility and controllability of the networks. In a manner of speaking, the emergence of the NFV and SDN makes the deployment of service function chains (SFC) more flexible and quick; although these technologies bring convenience, these technologies cause the SFC and virtualized network function (VNF) to be more vulnerable to attacks, making the traditional "plug-in" and "patch" network security mechanisms more challenging against potential attacks and potential security hazards.

The moving target defense is a theory and method proposed by the National Science and Technology Council of America to improve existing information system defects on the basis of the concept of dynamicalization, randomization and diversification. Its core idea is to build a dynamic and uncertain network space target environment, thereby increasing the attack difficulty, and coping with the network attacks with the randomness and unpredictability of a system. The moving target defense can be implemented in a plurality of aspects such as a network, a platform, a running environment, software, and data. The constantly variable target system environment and resource configuration relationship greatly increases the sniffing difficulty of information systems and the availability of system defects, and is an endogenous security technology mainly focusing on the running of the systems.

The mimic defense is a technical system primarily developed by the academician, Wu Jiangxing, of China, and declares that by constructing an information system operating environment of which the apparent structure is variable by means of a non-intrusive mimic defense support tool, platform, and product, a randomly generated network threat event can be quantized into a probability problem of generalized uncertain disturbances escaping from a multi-level differential mode infrastructure environment. The mimic defense can use its own dynamic heterogeneous redundancy mechanism, so that the sniffing and trying operations made by an attacker in the previous stage cannot be inherited in the vulnerability utilization stage, and a tolerance effect for intrusion is generated based on the concept of "quick avoidance", thereby ensuring the security of the system and the service continuity thereof. It provides a new view for solving the problem of component-level security, that is, the system itself has a typical dynamic heterogeneous redundancy (DHR) structure model, and has an active defense capability.

It is further pointed out that endogenous security, as an emerging network security technology, constructs a novel network security defense framework with the capabilities such as active defense, situation awareness, threat cleaning. The typical endogenous security technology includes mimic defense, moving target defense, trusted computing, zero trust architecture, etc.; by technical means such as constructing a novel information system running environment and key system resource access authentication, the endogenous security technology achieves a good defense effect in the protection of known and unknown network threats. On this basis, how to apply the endogenous security to the deployment of SFCs so as to improve the security of the SFCs and the virtualized network function (VNF) is a key point of the research of the present invention.

SUMMARY

The objective of the present invention: in order to solve the problems in current SFC deployment systems, such as SFCs and VNFs are vulnerable to attacks, it is difficult for the traditional "plug-in" and "patch" network security mechanisms to defend against the attacks, so that the present invention provides an endogenous dynamic defense architecture-based multi-objective service function chain deployment method.

The technical solution: an endogenous dynamic defense architecture-based multi-objective service function chain deployment method, comprising a computer readable medium operable on a computer with memory for the endogenous dynamic defense architecture-based multi-objective service function chain deployment method, and comprising program instructions for executing the following steps of:

(1) constructing an endogenous dynamic defense architecture to solve a multi-objective SFC deployment problem, including using a DHR as a core architecture of mimic defense, and the endogenous dynamic defense architecture comprising a basic mode and an enhanced mode, in which the basic mode includes using moving target defense to guarantee the security of a VNF, and shuffling the VNF, i.e. when the VNF is generated, dynamically changing an IP address, an execution code and a generation parameter, so that it is difficult for an attacker to perform prediction and attacks;

the enhanced mode includes using mimic defense to perform security protection on a VNF, and using a dynamic heterogeneous redundancy architecture for a VNF vulnerable to attacks, so as to achieve the capability of active defense;

(2) on the basis of the heterogeneity among replica VNFs, dividing a heterogeneous replica pool FE into more than one replica sub-pools, in which VNFs having many common vulnerabilities are divided into the same sub-pool, and VNF having few common vulnerabilities are divided into different sub-pools; the specific division flow is as follows:

(21) selecting p VNFs with the maximum degree of heterogeneity with other replica VNFs as initial centers of the sub-pools;

(22) traversing the heterogeneous replica pool FE, calculating the degree of heterogeneity of the replica VNF i and the p centers of the sub-pools, and allocating i to the sub-pool with the minimum degree of heterogeneity with the replica VNF i;

(23) updating the centers of the sub-pools, setting the VNFs which have the minimum sum of the degree of heterogeneity of the remaining VNFs in each sub-pool as the centers of the sub-pools, and then repeating the operations of steps (22) and (23), and ending the operation until the centers of the sub-pools do not change or the maximum number of iterations is reached;

(3) on the basis of the degree of heterogeneity of the VNFs and a historical information table, respectively selecting suitable VNFs from the sub-pools to be deployed by means of a replica VNF dynamic scheduling deployment algorithm, in which the replica VNF dynamic scheduling deployment algorithm includes the following three modes:

1) a basic mode: only using an MTD, and only performing regular shuffling on the VNFs without adding extra replicas;

2) an enhanced mode-1: using an MTD and mimic defense to select a plurality of VNFs with equivalent functions according to the heterogeneity, and regularly shuffling the VNFs; and 3) an enhanced mode-2: using an MTD and mimic defense, selecting a plurality of VNFs with equivalent functions according to the heterogeneity, performing dynamic switching according to historical information, and regularly shuffling the VNFs.

Further, in step (1), for the enhanced mode, a DHR is used as a core architecture of mimic defense, which is composed of an input module, a processing module, an output module, a construction module and a scheduling module;

the input module is composed of a user input and a service scheduling agent, and after an SDA replicas the user input to obtain n user inputs so as to form n sub-inputs, the SDA distributes the n sub-inputs to the deployment set BE in the processing module;

the processing module is composed of the deployment set BE, and the replica VNFs in the deployment set process the n sub-inputs formed by the input module to form n sub-outputs, and then sends same to a mimic decision point for determination;

the output module is composed of MDP and is used for determining n sub-outputs of the same input message, and if k or more than k results are consistent, then outputting the results; otherwise, stopping outputting;

the construction module comprises a heterogeneous replica pool FE and a heterogeneous replica set AE, divides the heterogeneous replica pool FE into p sub-pools according to a sub-pool division algorithm, and selects a replica from each sub-pool according to a scheduling algorithm, so as to form the heterogeneous replica set AE; and the scheduling module selects n replicas from the heterogeneous replica set AE as the deployment set BE in the processing module according to the scheduling and deployment algorithm, and after a scheduling period, the scheduling module removes the BE, restores same to an initial state by shuffling, and reselects a deployment set for the next scheduling period according to the scheduling and deployment algorithm.

Further, step (2) is performed to measure the heterogeneity between different replica VNFs by means of a Jaccard distance, the heterogeneity between the VNF $f_i$ and the VNF $f_j$ being expressed as follows:

$$Dist(\alpha_i, \alpha_j) = 1 - \frac{\|\alpha_i + \alpha_j\|}{|\alpha_i + \alpha_j|}$$

$$\alpha_i = [qvn_{i1}, qvn_{i2}, \ldots, qvn_{i|VN|}]^T,$$

$$\alpha_j = [qvn_{j1}, qvn_{j2}, \ldots, qvn_{j|VN|}]^T$$

where $\alpha_i$ and $\alpha_j$ represent vulnerability vectors of the VNF $f_i$ and the VNF $f_j$, when the VNF $f_i$ has a vulnerability $vn_z$, $qvn_z=1$, otherwise $qvn_z=0$.

Further, the replica VNF dynamic scheduling deployment algorithm in step (3) specifically includes the following processes:

(31) randomly selecting a VNF from a certain sub-pool and adding same to a heterogeneous replica set AE;

(32) sequentially traversing the VNFs in the remaining sub-pools, and if the enhanced mode-1 is adopted, selecting a replica with the maximum degree of heterogeneity with other VNFs in the AE and adding same to the AE; if the enhanced mode-2 is adopted, selecting a replica with the maximum degree of heterogeneity with other VNFs in the AE and adding same into the AE in combination with the historical information table;

(33) traversing the heterogeneous replica set AE, and selecting a part of VNFs according to the degree of heterogeneity and adding same to a deployment set BE;

(34) if the basic mode is adopted, directly adding the original VNF to the deployment set BE;

(35) deploying the replica set BE by using a DRL-based algorithm, and regularly shuffling the VNFs in the BE.

Still further, the multi-objective SFC deployment problem described in step (1) is described in detail as follows:

defining a vulnerability set as $VN=\{vn_z|z\in[1, |VN|]\}$, each VNF vulnerable to attacks containing $\alpha$ vulnerabilities; and defining a heterogeneous replica VNF pool as $FE=\{fe_l|l\in[1, |FE|]\}$, each replica VNF also containing $\alpha$ vulnerabilities;

an objective function for the SFC deployment problem is as follows:

$$\min(f_1+f_2+f_3)$$

$$s.t.\ C_1, C_2, C_3$$

$$\begin{cases} f_1 = \sum_{r_\mu \in R} D_\mu \\ f_2 = \sum_{r_\mu \in R} \frac{1}{|A_\mu|} \sum_{a=1}^{|A_\mu|} \frac{q_a}{Q} \\ f_3 = C(\tau) \end{cases}$$

for $f_1$, $D_\mu$ is the total response time delay with the expression as follows:

$$D_\mu = L_\mu + P_\mu + T_\mu + W_\mu$$

where $L_\mu = \Sigma_{e_h^\mu \in E_\mu} \Sigma_{e_j \in E} x_{e_h^\mu}^{e_j} D_{e_j}$ is a communication time delay, $$P_\mu = \sum_{f_v^\mu \in F_\mu} \sum_{n_i \in N} x_{f_v^\mu}^{n_i} \cdot \frac{1}{\frac{n_{m_i}^\mu c_{m_i}}{w_{m_i}^\mu} - \lambda_\mu + \varepsilon}$$

is a processing time delay, $$T_\mu = \sum_{f_v^\mu \in F_\mu} \frac{U}{v_\mu}$$

is a transmission time delay, and $$W_\mu = \sum_{a=1}^{|A_\mu|} \left( \max \frac{V_\mu}{K_{f_\omega^a}} \right) + W_{sh} + W_{sw}$$

is an additional time delay brought by the dynamic defense architecture;

for $$f_2, \sum_{r_\mu \in R} \frac{1}{|A_\mu|} \sum_{a=1}^{|A_\mu|} \frac{q_a}{Q}$$

is an average defense success rate, where q represents the number of defense successes, and Q represents the total number of attacks;

for $f_3$, $C(\tau)$ represents total deployment costs with the expression as follows:

$$C(\tau) = C_{operational}(\tau) + C_{replica}(\tau)$$

$C_{operational}(\tau)$ represents total operating costs, which is the sum of starting costs of a server and costs of successfully placing a VNF;

$$C_{operational}(\tau) = \Sigma_{n_i \in N} \Sigma_{f_v^\mu \in F_\mu} x_{f_v^\mu}^{n_i} \zeta_c C_{f_v^\mu} + \Sigma_{e_j \in E} \Sigma_{e_h^\mu \in E_\mu} x_{e_h^\mu}^{e_j} \zeta_B B_\mu + \Sigma_{n_i \in N} \zeta_O$$

$x_{f_v^\mu}^{n_i}$ represents whether a VNF $f_v^\mu \in F_\mu$ is deployed on a server node $n_i \in N$ in a request $r_\mu \in R$, $x_{e_h^\mu}^{e_j}$ represents whether a virtual link $e_h^\mu \in E_\mu$ is mapped onto a physical link $e_j \in E$ in a request $r_\mu \in R$, $\zeta_c$ and $\zeta_B$ respectively represent the unit costs of resources and bandwidths, $C_{f_v^\mu}$ represents a resource requirement of the VNF $f_v^\mu \in F_\mu$, and $\zeta_O$ represents the starting costs of the server;

$C_{replica}(\tau) = C_{pool}(\tau) + C_{shuffling}(\tau) + C_{switching}(\tau)$ represents additional costs brought about by the endogenous dynamic defense architecture, where $C_{pool}(\tau) = \Sigma_{f \in FE} \zeta_c C_f$ represents costs of maintaining the heterogeneous replica VNF pool, $$C_{shuffling}(\tau) = \frac{|R|}{x} C_{sh}$$

represents costs of shuffling, and $C_{switching}(\tau) = \Sigma_{r_\mu \in R} C_{sw}(r_\mu)$ represents costs of switching.

Beneficial effects: compared with the prior art, the method of the present invention enables the SFC and VNF to have an active defense capability by constructing an endogenous dynamic defense architecture, enables that the sniffing and trying operations made by an attacker in the previous stage cannot be inherited in the vulnerability utilization stage by means of a dynamic heterogeneous redundancy mechanism of mimic defense itself, and increases the attack difficulty by constructing a dynamic and uncertain network space target environment by means of moving target defense, thereby coping with the network attacks with randomness and unpredictability of a system, so as to solve the problems in current SFC deployment systems, such as SFCs and VNFs are vulnerable to attacks, and the problem that it is difficult for the traditional "plug-in" and "patch" network security mechanisms to defend against the attacks. On the basis of the implementation of the method, the present invention includes providing a sub-pool division algorithm and a replica VNF dynamic scheduling deployment algorithm, thereby providing a novel method for selecting, scheduling and deploying VNF replicas, so that the security of VNFs and SFCs in the deployment process is greatly improved.

DETAILED DESCRIPTION

To describe the technical solutions disclosed in the present invention in detail, the present invention is further described as follows with reference to the accompanying drawings and embodiments.

The present invention provides an endogenous dynamic defense architecture-based multi-objective service function chain deployment method, which is mainly used for solving the problems in current SFC deployment systems, such as SFCs and VNFs are vulnerable to attacks, and the problem that it is difficult for the traditional "plug-in" and "patch" network security mechanisms to defend against the attacks.

The endogenous dynamic defense architecture proposed in the present invention mainly relates to two defense modes, i.e. moving target defense and mimic defense. The present invention combines same with the SFC deployment to improve the security.

The implementation process of the technical solution provided by the present invention will be described in detail below.

According to the method of the present invention, the deployment of the SFC is implemented by using an endogenous dynamic defense architecture, which mainly includes two modes and five modules. The basic mode only relates to the moving target defense, and the enhanced mode relates to moving target defense and mimic defense. The input module is responsible for replicating an input and distributing same to a processing module; the processing module is responsible for processing a deployment set obtained from a scheduling module and the input obtained from the input module to form sub-outputs and send same to an output module; the output module determines the sub-outputs obtained from the processing module; a construction module is responsible for obtaining a heterogeneous replica set from a heterogeneous replica pool; and the scheduling module is responsible for obtaining a deployment set from the heterogeneous replica set according to a scheduling deployment algorithm.

Figure 1:
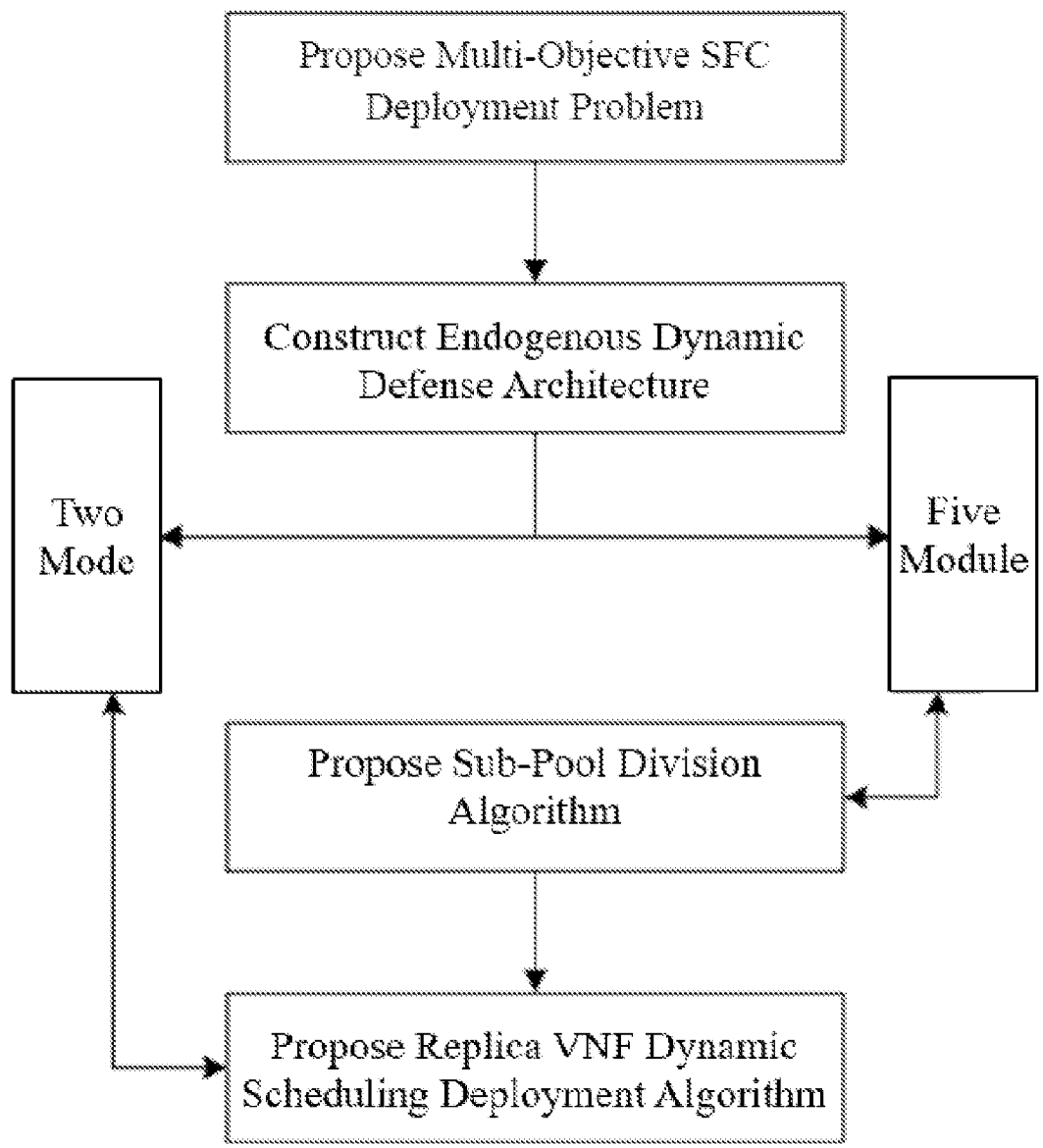
FIG. 1 is a schematic flowchart of the method of the present invention.

As shown in FIG. 1, on the basis of the described technical solution, the implementation of the method of the present invention includes the following steps:

(1) constructing an endogenous dynamic defense architecture to solve a multi-objective SFC deployment problem, the architecture including two modes and five modules;

(2) on the basis of the heterogeneity among replica VNFs, proposing a sub-pool division algorithm to divide a heterogeneous replica pool into a plurality of sub-pools; and (3) on the basis of the degree of heterogeneity of the VNFs and a historical information table, proposing a replica VNF dynamic scheduling deployment algorithm to respectively select suitable VNFs from the sub-pools to be deployed;

Specific implementations of the steps of the present invention are further described with respect to the described steps of the present invention.

Step 1: an endogenous dynamic defense architecture is constructed.

Figure 2:
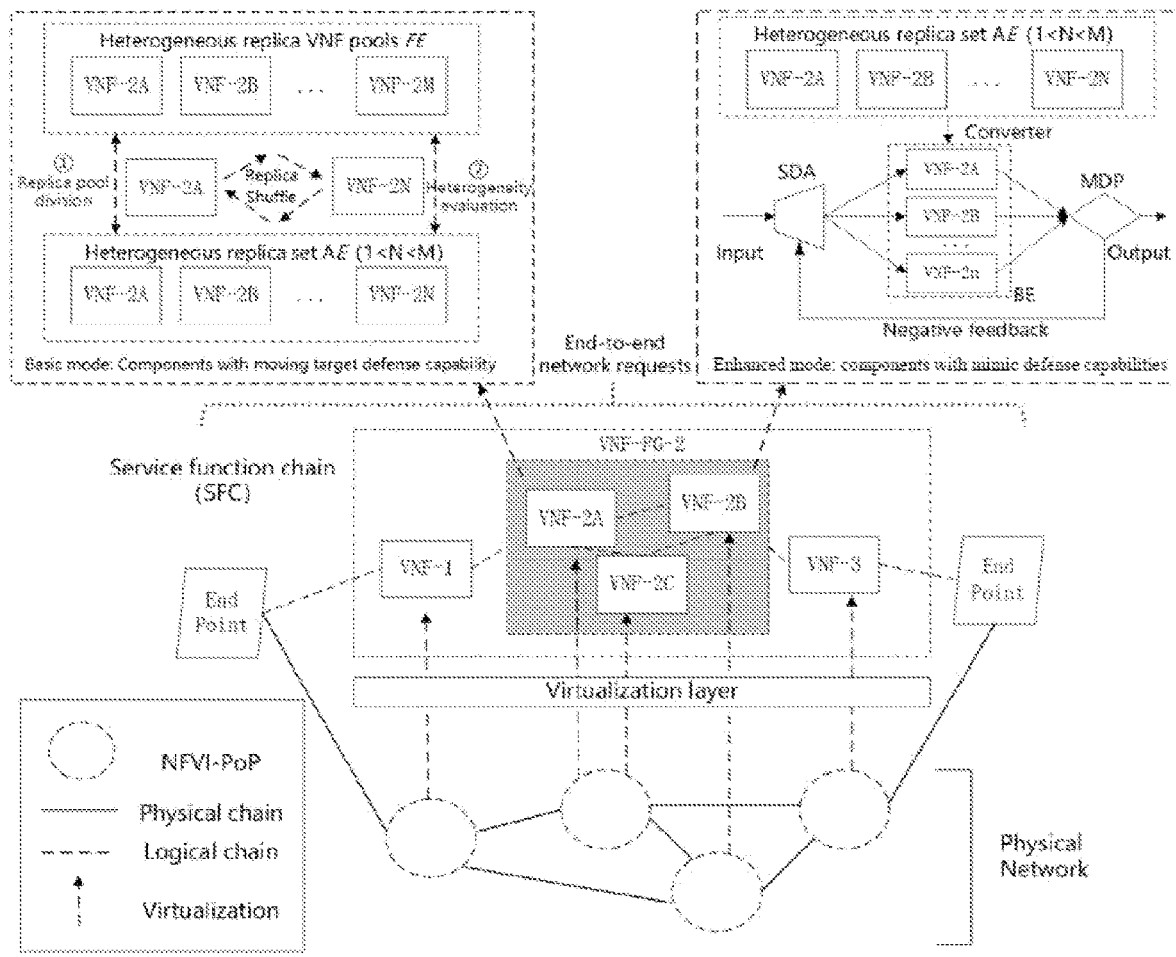
FIG. 2 is a diagram of the endogenous dynamic defense architecture according to the method of the present invention.

As shown in FIG. 2, the architecture includes the following two modes:

the basic mode includes using moving target defense to guarantee the security of a VNF, and shuffling the VNF, i.e. when the VNF is generated, dynamically changing an IP address, an execution code and a generation parameter, so that it is difficult for an attacker to perform prediction and attacks;

the enhanced mode includes using mimic defense to perform security protection on a VNF, i.e. a VNF vulnerable to attacks can use a dynamic heterogeneous redundancy (DHR) architecture to achieve the capability of active defense;

and the DHR is used as a core architecture of mimic defense, which is composed of an input module, a processing module, an output module, a construction module and a scheduling module. The specific content is as follows:

1) the input module is composed of a user input and a service scheduling agent (SDA). After replicating the user input to obtain n user inputs so as to form n sub-inputs, the SDA distributes the n sub-inputs to the deployment set BE in the processing module.

2) The processing module is composed of the deployment set BE, and the replica VNFs in the deployment set process the n sub-inputs formed by the input module to form n sub-outputs, and then sends same to a mimic decision point (MDP) for determination.

3) The output module is composed of an MDP and is used for determining n sub-outputs of the same input message, and if k or more than k results are consistent, then outputting the results; otherwise, stopping outputting.

4) The construction module includes a heterogeneous replica pool FE and a heterogeneous replica set AE; the heterogeneous replica pool FE is divided into p sub-pools according to a sub-pool division algorithm, and selects a replica from each sub-pool according to a scheduling algorithm, so as to form the heterogeneous replica set AE.

5) In the scheduling module, n replicas are selected from the heterogeneous replica set AE as the deployment set BE in the processing module according to the scheduling deployment algorithm. After a scheduling period, the scheduling module removes the BE, restores same to an initial state by shuffling, and reselects a deployment set for the next scheduling period according to the scheduling and deployment algorithm.

Step 2: Proposed a multi-objective SFC deployment problem in combination with the actual condition and proposed endogenous dynamic defense architecture.

In the present invention, a vulnerability set is defined as $VN=\{vn_z | z \in [1, |VN|]\}$, each VNF vulnerable to attacks containing $\alpha$ vulnerabilities; and a heterogeneous replica VNF pool is defined as $FE=\{fe_l | l \in [1, |FE|]\}$, each replica VNF also containing $\alpha$ vulnerabilities.

An objective function of the SFC deployment problem is as follows:

$$\min(f_1+f_2+f_3)$$

$$s.t.\ C_1, C_2, C_3$$

$$\begin{cases} f_1 = \sum_{r_\mu \in R} D_\mu \\ f_2 = \sum_{r_\mu \in R} \frac{1}{|A_\mu|} \sum_{a=1}^{|A_\mu|} \frac{q_a}{Q} \\ f_3 = C(\tau) \end{cases}$$

For $f_1$, $D_\mu$ is the total response time delay, i.e.

$$D_\mu = L_\mu + P_\mu + T_\mu + W_\mu,$$

where $L_\mu = \sum_{e_h^u \in E_\mu} \sum_{e_j \in E} x_{e_h^u}^{e_j} D_{e_j}$ is a communication time delay, $$P_\mu = \sum_{f_v^\mu \in F_\mu} \sum_{n_i \in N} x_{f_v^\mu}^{n_i} \cdot \frac{1}{\frac{\eta_{m_i}^\mu c_{m_i}}{w_{m_i}^\mu} - \lambda_\mu + \varepsilon}$$

is a processing time delay, $$T_\mu = \sum_{f_v^\mu \in F_\mu} \frac{U}{v_\mu}$$

is a transmission time delay, and $$W_\mu = \sum_{a=1}^{|A_\mu|} \left( \max \frac{v_\mu}{K_{f_a}} \right) + W_{sh} + W_{sw}$$

is an additional time delay brought by the dynamic defense architecture;

For $$f_2, \sum_{r_\mu \in R} \frac{1}{|A_\mu|} \sum_{a=1}^{|A_\mu|} \frac{q_a}{Q}$$

is an average defense success rate, where q represents the number of defense successes, and Q represents the total number of attacks.

For $f_3$, $C(\tau)$ represents total deployment costs, i.e., $$C(\tau) = C_{operational}(\tau) + C_{replica}(\tau)$$

$C_{operational}(\tau)$ represents total operating costs, which is the sum of starting costs of a server and costs of successfully placing a VNF;

$$C_{operational}(\tau) = \Sigma_{n_i \in N} \Sigma_{f_v^\mu \in F_\mu} x_{f_v^\mu}^{n_i} \zeta_c C_{f_v^\mu} + \Sigma_{e_j \in E} \Sigma_{e_h^\mu \in E_\mu} x_{e_h^\mu}^{e_j} \zeta_B B_\mu + \Sigma_{n_i \in N} \zeta_O$$

$x_{f_v^\mu}^{n_i}$ represents whether a VNF $f_v^\mu \in F_\mu$ is deployed on a server node $n_i \in N$ in a request $r_\mu \in R$, $x_{e_h^\mu}^{e_j}$ represents whether a virtual link $e_h^\mu \in E_\mu$ is mapped onto a physical link $e_j \in E$ in a request $r_\mu \in R$, $\zeta_c$ and $\zeta_B$ respectively represent the unit costs of resources and bandwidths, $C_{f_v^\mu}$ represents a resource requirement of the VNF $f_v^\mu \in F_\mu$, and $\zeta_O$ represents the starting costs of the server;

$C_{replica}(\tau) = C_{pool}(\tau) + C_{shuffling}(\tau) + C_{switching}(\tau)$ represents the additional costs brought about by the endogenous dynamic defense architecture, where $C_{pool}(\tau) = \Sigma_{f \in FE} \zeta_c C_f$ represents costs of maintaining the heterogeneous replica VNF pool, $$C_{shuffling}(\tau) = \frac{|R|}{x} C_{sh}$$

represents costs of shuffling, and $C_{switching}(\tau) = \Sigma_{r_\mu \in R} C_{sw}(r_\mu)$ represents costs of switching.

The resource constraint is as follows:

$$\forall n_i \in N, \Sigma_{f_v^\mu \in F_\mu} \Sigma_{l \in Nf_v^\mu} s_{n_i,\tau}^{f_v^\mu} \cdot C_{f_v^\mu} \leq C_{n_i}, \quad C_1:$$

where $s_{n_i,\tau}^{f_v^\mu}$ represents the number of service instances of the VNFs $f_v^\mu \in F_\mu$ deployed on the node $n_i \in N$, and represents the size of the resource (CPU and memory) of the node $n_i \in N$.

The bandwidth constraint is as follows:

$$\forall e_j \in E, \Sigma_{r_\mu \in R} \Sigma_{e_h^\mu \in E_\mu} x_{e_h^\mu}^{e_j} \cdot a_{r,\tau} \cdot B_\mu \leq B_{e_j}, \quad C_2:$$

where $a_{r,\tau}$ represents whether the request $r_\mu \in R$ is still in a service, and $B_{e_j}$ represents the bandwidth size of the node $n_i \in N$.

The delay constraint is as follows:

$$\forall r_\mu \in R, D_\mu \leq D_\mu^{max}, \quad C_3:$$

where $D_\mu^{max}$ represents the maximum end-to-end delay size.

Step 3: a sub-pool division algorithm is designed.

According to the heterogeneity among replica VNFs, the sub-pool division algorithm divides a heterogeneous replica pool FE into a plurality of replica sub-pools, in which the VNFs having many common vulnerabilities are divided into the same sub-pool, and the VNFs having few common vulnerabilities are divided into different sub-pools. In the present invention, the heterogeneity between different replica VNFs is measured by means of a Jaccard distance $f_i$, and the heterogeneity between the VNF $f_i$ and the VNF $f_j$ is represented as follows:

$$Dist(\alpha_i, \alpha_j) = 1 - \frac{\|\alpha_i + \alpha_j\|}{|\alpha_i + \alpha_j|}$$

$$\alpha_i = [qvn_{i1}, qvn_{i2}, \ldots, qvn_{i|VN|}]^T,$$

$$\alpha_j = [qvn_{j1}, qvn_{j2}, \ldots, qvn_{j|VN|}]^T$$

where $\alpha_i$ and $\alpha_j$ represent vulnerability vectors of the VNF $f_i$ and the VNF $f_j$, when the VNF $f_i$ has a vulnerability $vn_z$, $qvn_z=1$, otherwise $qvn_z=0$.

The specific algorithm flow is as follows:
1) selecting p VNFs with the maximum degree of heterogeneity with other replica VNFs as initial centers of the sub-pools;
(2) traversing the FE, calculating the degree of heterogeneity of the replica VNF i and the p centers of the sub-pools, and allocating i to the sub-pool with the minimum degree of heterogeneity with the replica VNF i;
(3) updating the centers of the sub-pools, setting the VNFs which have the minimum sum of the degree of heterogeneity of the remaining VNFs in each sub-pool as the centers of the sub-pools, and then repeating the operations of steps 2) and 3), and ending the operation until the centers of the sub-pools do not change or the maximum number of iterations is reached.

4. A replica VNF dynamic scheduling deployment algorithm is designed.

The objective of the replica VNF dynamic scheduling deployment algorithm is to select appropriate VNFs from the sub-pools for deployment in combination with the historical information and the heterogeneity between the VNFs, so as to improve the security of the SFCs, specifically:

the replica VNF dynamic scheduling deployment algorithm includes the three modes:
1) a basic mode: only using an MTD, and only performing regular shuffling on the VNFs without adding extra replicas;
2) an enhanced mode-1: using an MTD and mimic defense to select a plurality of VNFs with equivalent functions according to the heterogeneity, and regularly shuffling the VNFs; and
3) an enhanced mode-2: using an MTD and mimic defense, selecting a plurality of VNFs with equivalent functions according to the heterogeneity, performing dynamic switching according to historical information, and regularly shuffling the VNFs.

The specific algorithm flow is as follows:
1) randomly selecting a VNF from a certain sub-pool and adding same to a heterogeneous replica set AE;
2) sequentially traversing the VNFs in the remaining sub-pools, and if the enhanced mode-1 is adopted, selecting a replica with the maximum degree of heterogeneity with other VNFs in the AE and adding same to the AE; if the enhanced mode-2 is adopted, selecting a replica with the maximum degree of heterogeneity with other VNFs in the AE and adding same into the AE in combination with the historical information table;

3) traversing the heterogeneous replica set AE, and selecting a part of VNFs according to the degree of heterogeneity and adding same to a deployment set BE;
4) if the basic mode is adopted, directly adding the original VNF to the deployment set BE; and
5) deploying the replica set BE by using a deep reinforcement learning (DRL)-based algorithm, and regularly shuffling the VNFs in the BE.

In this embodiment, in order to verify the actual effect of the present invention, an attack algorithm is designed to perform attack simulation on the deployed VNFs. The attack algorithm includes three different attack modes, which are specifically described as follows:
1) random attacking (RdA), i.e. an attacker randomly generates a vulnerability to attack a VNF vulnerable to attacks;
2) local preference attacking (LpA), i.e. there is a high probability that a vulnerability with a high attack success rate generates subsequently; and
3) sequential attacking (SeqA), i.e. an attacker generates vulnerabilities in sequence to attack a VNF vulnerable to attacks, and the sequence of generating vulnerabilities can be changed with a certain probability.

In the present invention, it is assumed that only a vulnerability is used per attack, and the VNF vulnerable to attacks is attacked N times in total, and each attack generates vulnerabilities by using the described three manners. If there are more than b/2+1 common vulnerabilities in b VNFs at the same time, the attack succeeds; otherwise, the attack fails, and a VNF having a problem in the multi-mode determination is marked, so as to reduce the probability of subsequent selection thereof, thereby improving the security of a system.

Figure 3:
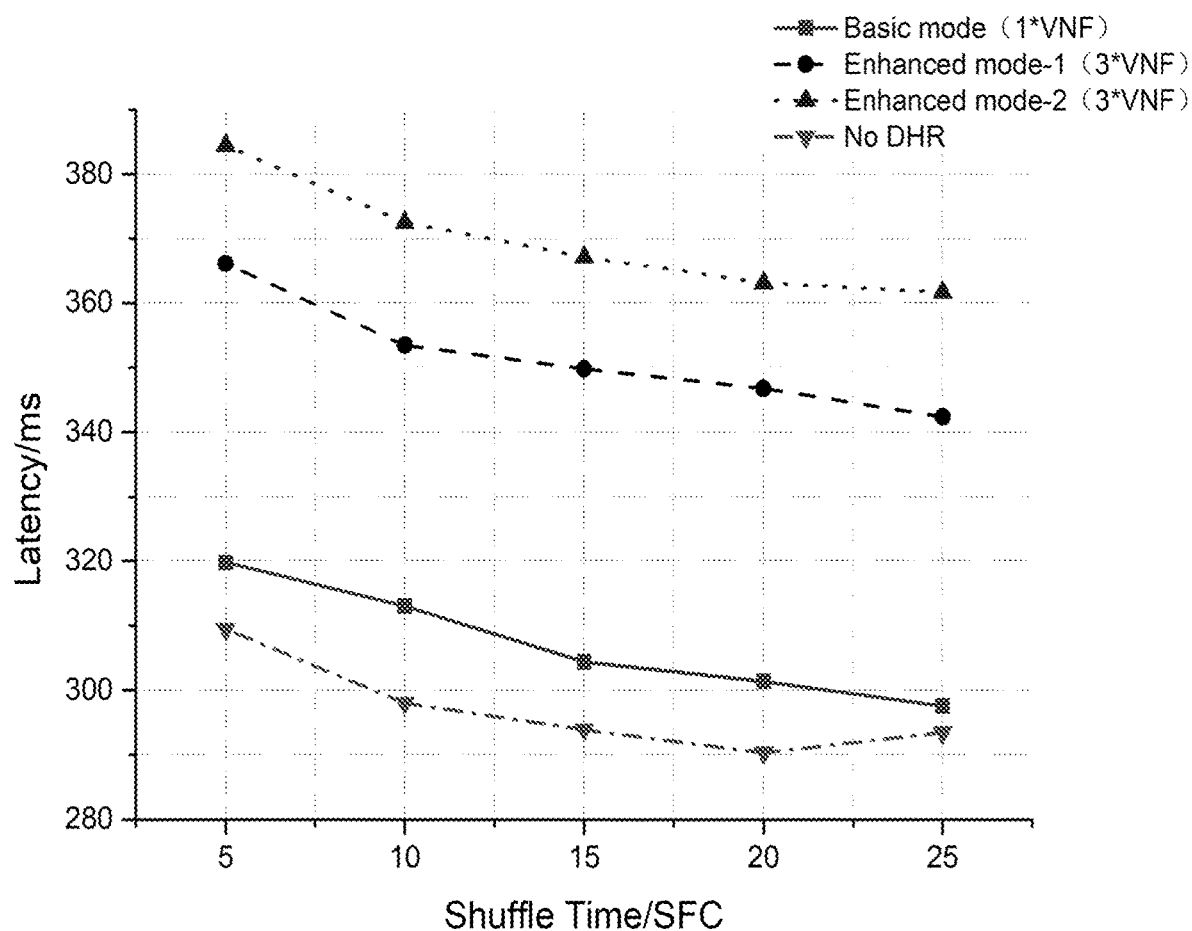
FIG. 3 is an average time delay comparison diagram of batches at different shuffle times.
Figure 5A:
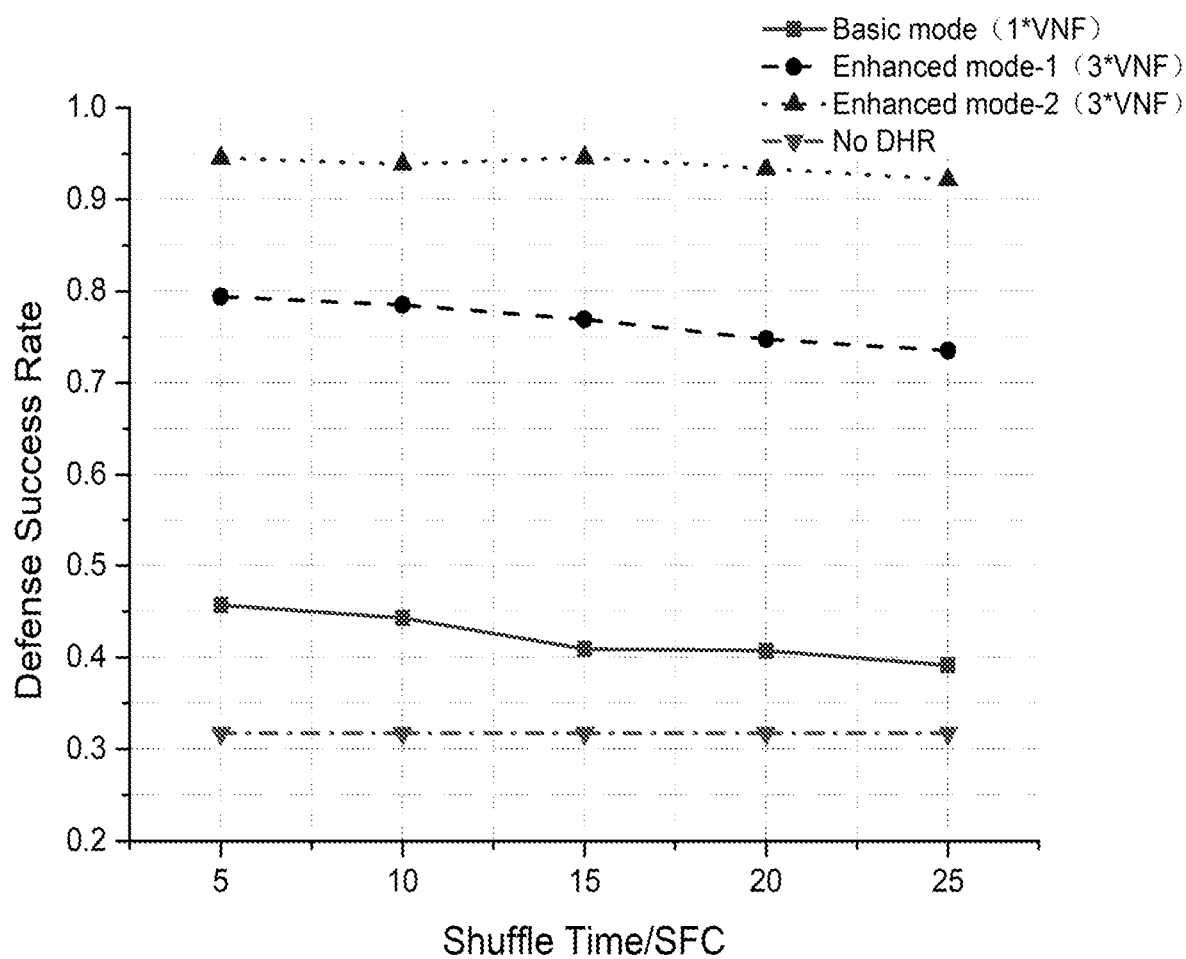
FIG. 5A is a comparison diagram of the defense success rates using LpA at different shuffle times.
Figure 5B:
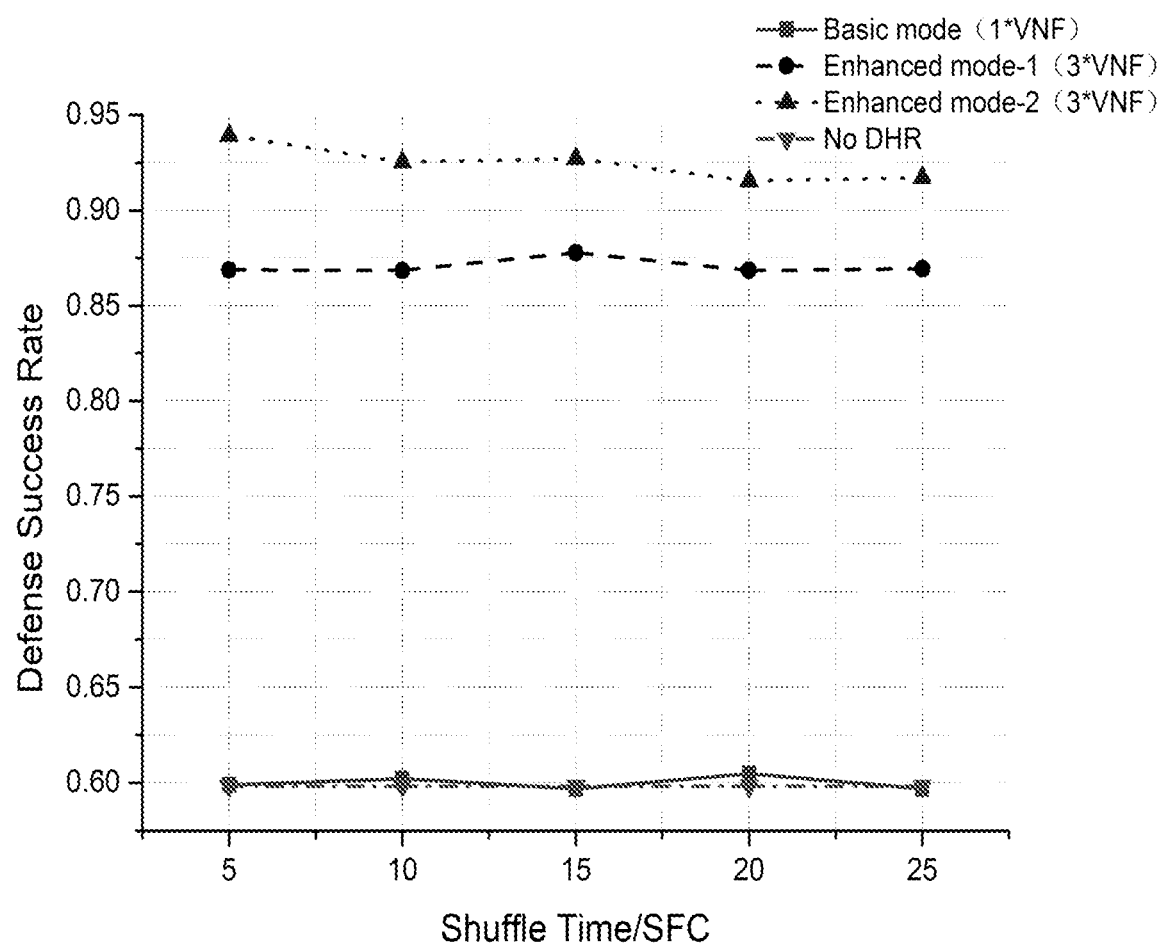
FIG. 5B is a comparison diagram of the defense success rates usingRdA at different shuffle times.
Figure 5C:
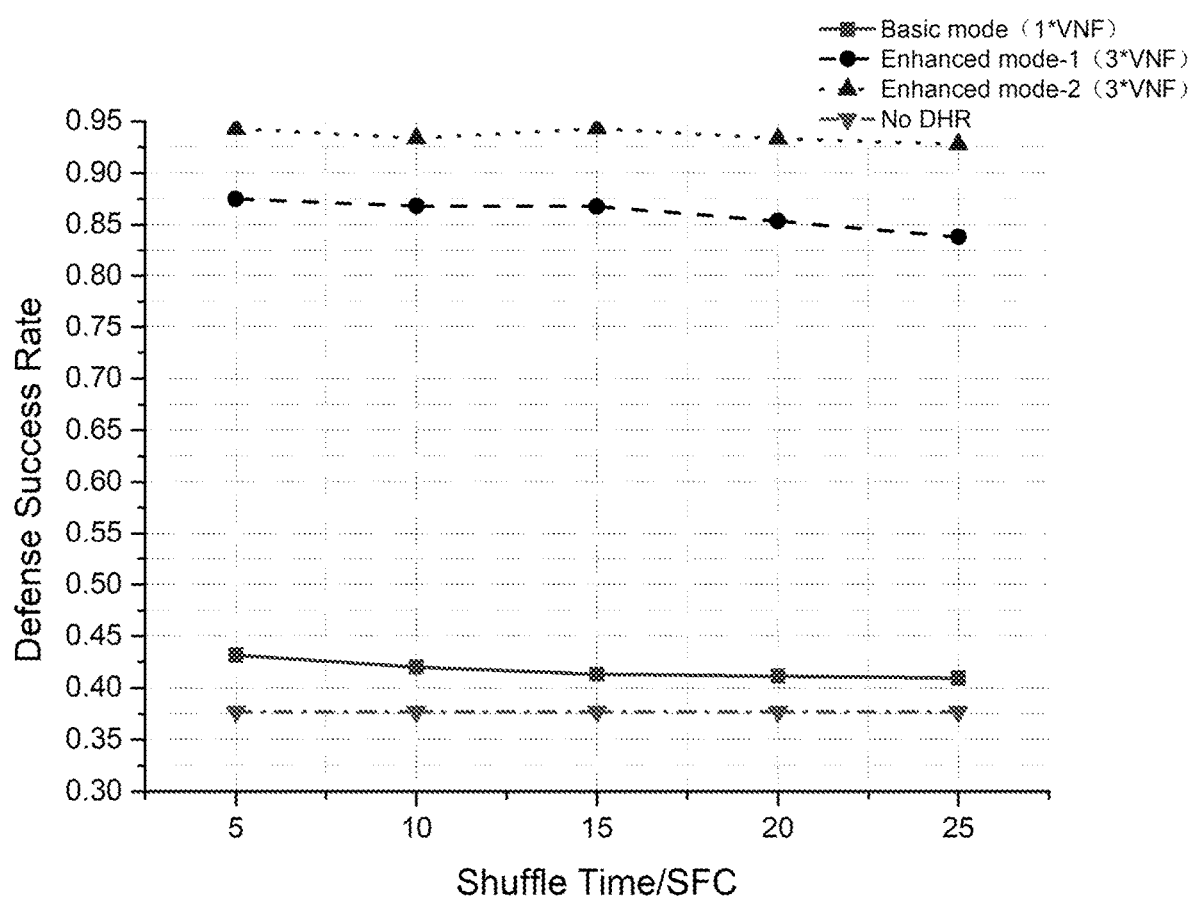
FIG. 5C is a comparison diagram of the defense success rates using SeqA at different shuffle times.

In FIG. 3, the average time delays of the batches of the four modes are compared when the shuffle time varies from 5 to 25. It can be determined from the figure that, with the increase of the shuffle time, the time delays of the four modes are gradually reduced, the time delay of the SFC deployment algorithm without endogenous security is the lowest, and the time delay of the enhanced mode-2 method is the highest. In the enhanced mode-2, each VNF vulnerable to attacks additionally has a step of selecting a replica with the highest historical security defense success rate from a historical information table for switching in a deployment process. Compared with the enhanced mode-1, an additional switching time is increased. The time delay of the basic mode is lower than that of the enhanced mode as it only performs simple shuffling without involving additional replicating and related operations. It can be determined from FIG. 5A-C that the security requirement of the system is satisfied at the cost of lowering the time delay requirement.

Figure 4:
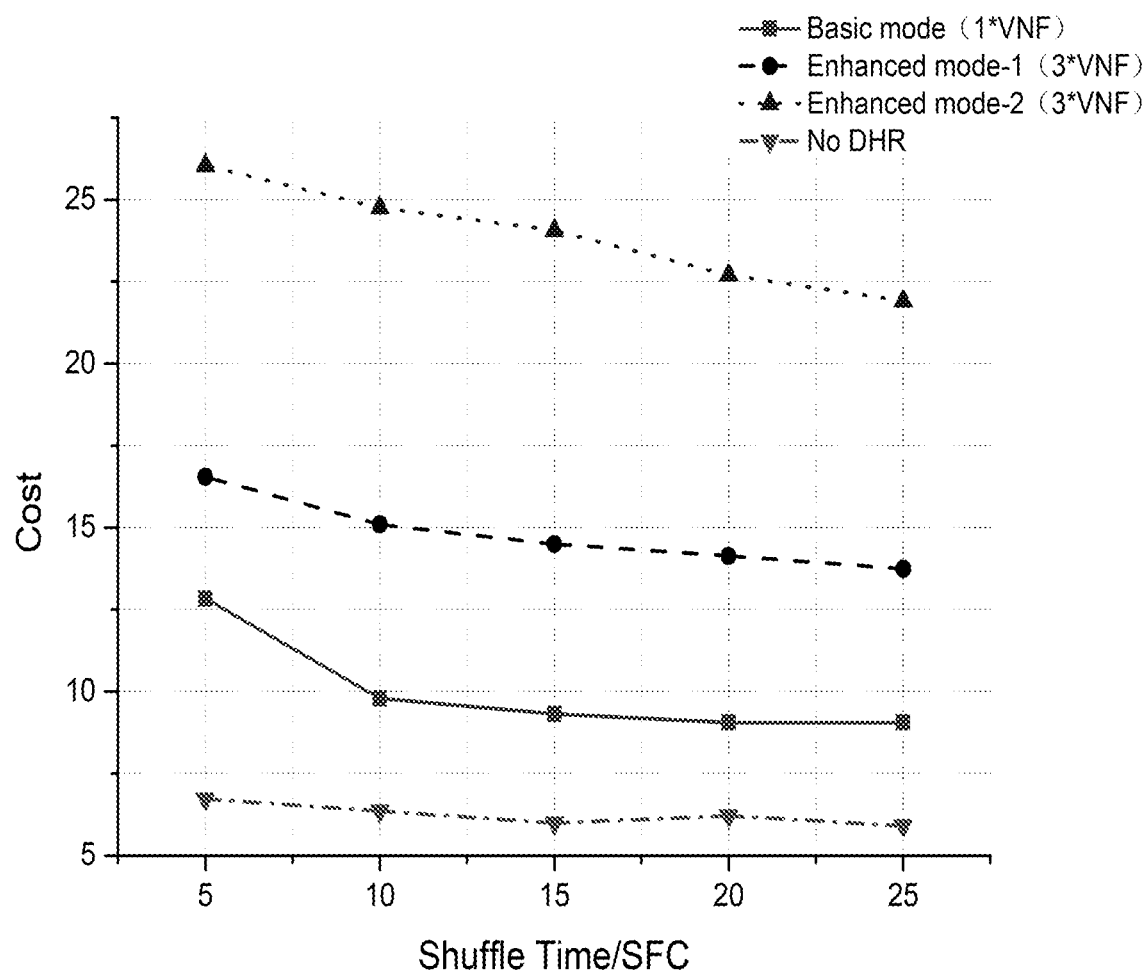
FIG. 4 is an average costs comparison diagram of SFCs at different shuffle times.

Next, the average costs per SFC for the four modes when the shuffle time varies from 5 to 25 are explored in this embodiment. It can be determined from FIG. 4 that with the increase of the shuffle time, costs of the four modes gradually decrease, and costs of an SFC deployment algorithm without endogenous security are the lowest; however, the enhanced mode-2 not only has a shuffling function, but also fully considers the heterogeneity and historical information of the replicas, and thus costs thereof are always the highest. In the enhanced-mode-2, during deployment, a VNF vulnerable to attacks also needs to additionally select a replica with the highest historical security defense success rate from a historical information table for switching. Compared with the enhanced mode-1, redundant switching costs are increased. It can be determined from FIG. 5A-C that in order to increase the security of the system, certain costs need to be sacrificed.

In this embodiment, the defense success rates of several algorithms using different attack modes when the shuffle time varies from 5 to 25 are compared. It can be determined from FIG. 5 that in the three different attack modes, as the shuffle time varies, the defense success rate of the enhanced mode-2 is always the highest, while the defense success rate of the SFC deployment algorithm without endogenous security is always the lowest. It can be determined from FIG. 5A and FIG. 5C that the defense success rates of the basic mode and the enhanced mode-1 decrease as the shuffle time increases. In enhanced mode-2, during the deployment process, a VNF vulnerable to attacks may dynamically select a replica with the highest historical security defense according to a historical information table for switching, and therefore the defense success rate of enhanced mode-2 does not always decrease as the shuffle time increases. It can be determined from FIG. 5B that as RdA has randomness, the obtained result also has certain randomness. However, in general, the endogenous dynamic defense architecture proposed in the present invention can significantly improve the security of the SFC in all three attack modes.

Figure 6A:
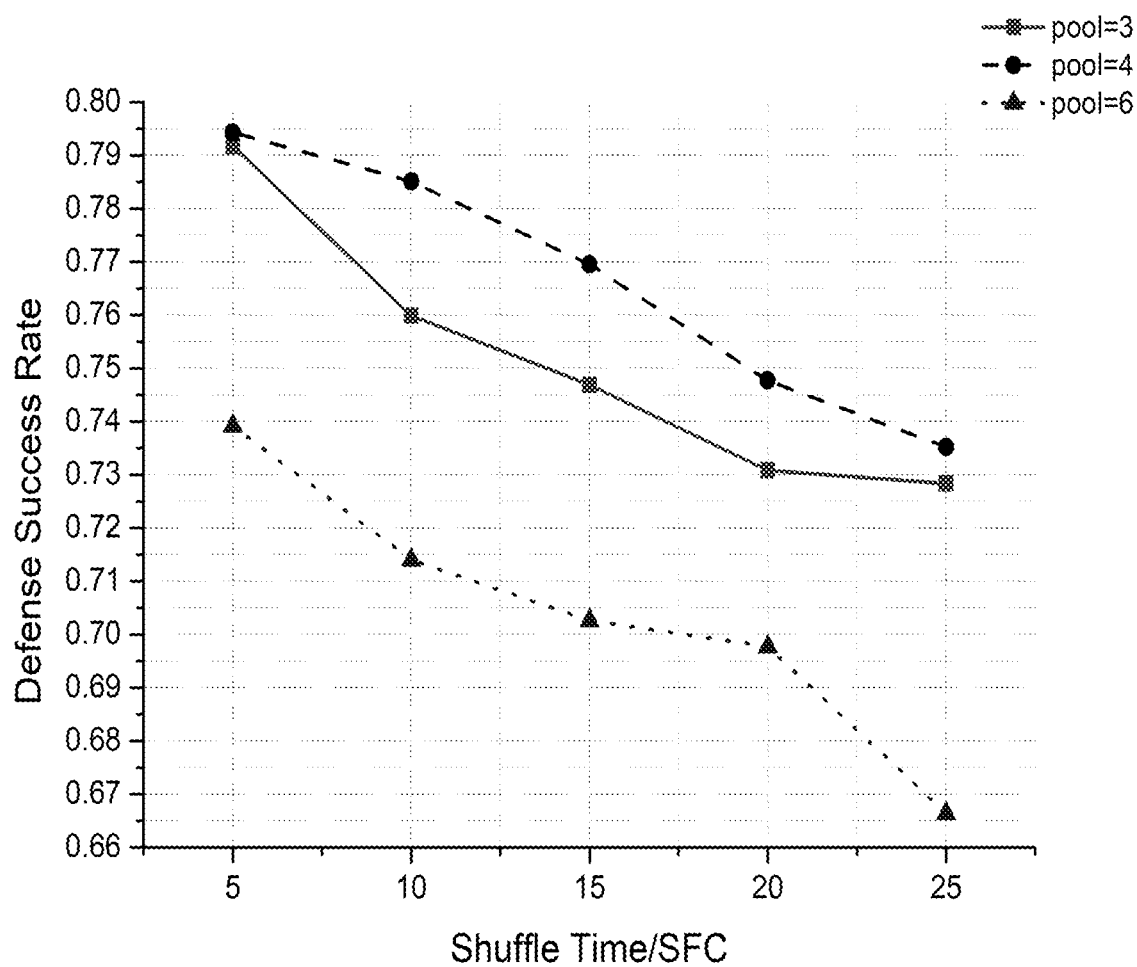
FIG. 6A is a comparison diagram of the defense success rates using the enhanced mode-1 and LpA at different shuffle times.
Figure 6B:
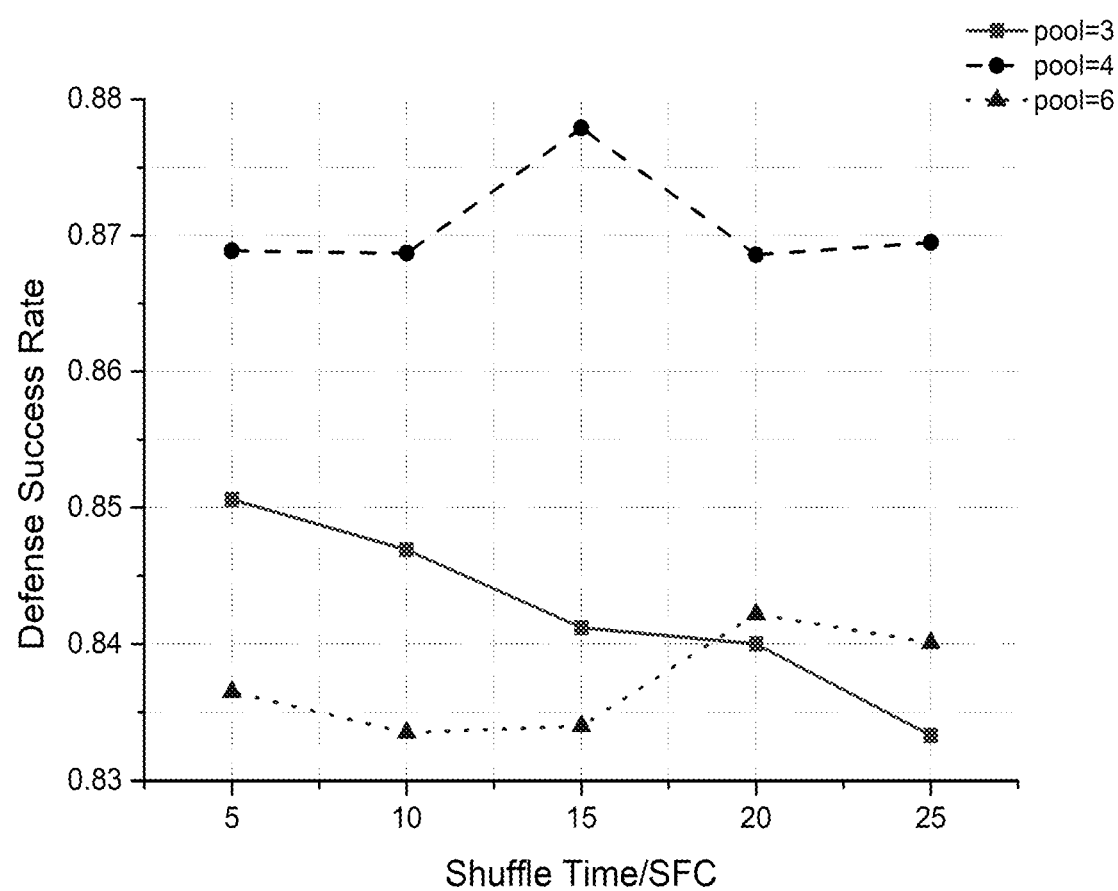
FIG. 6B is a comparison diagram of the defense success rates using the enhanced mode-1 and RdA at different shuffle times.
Figure 6C:
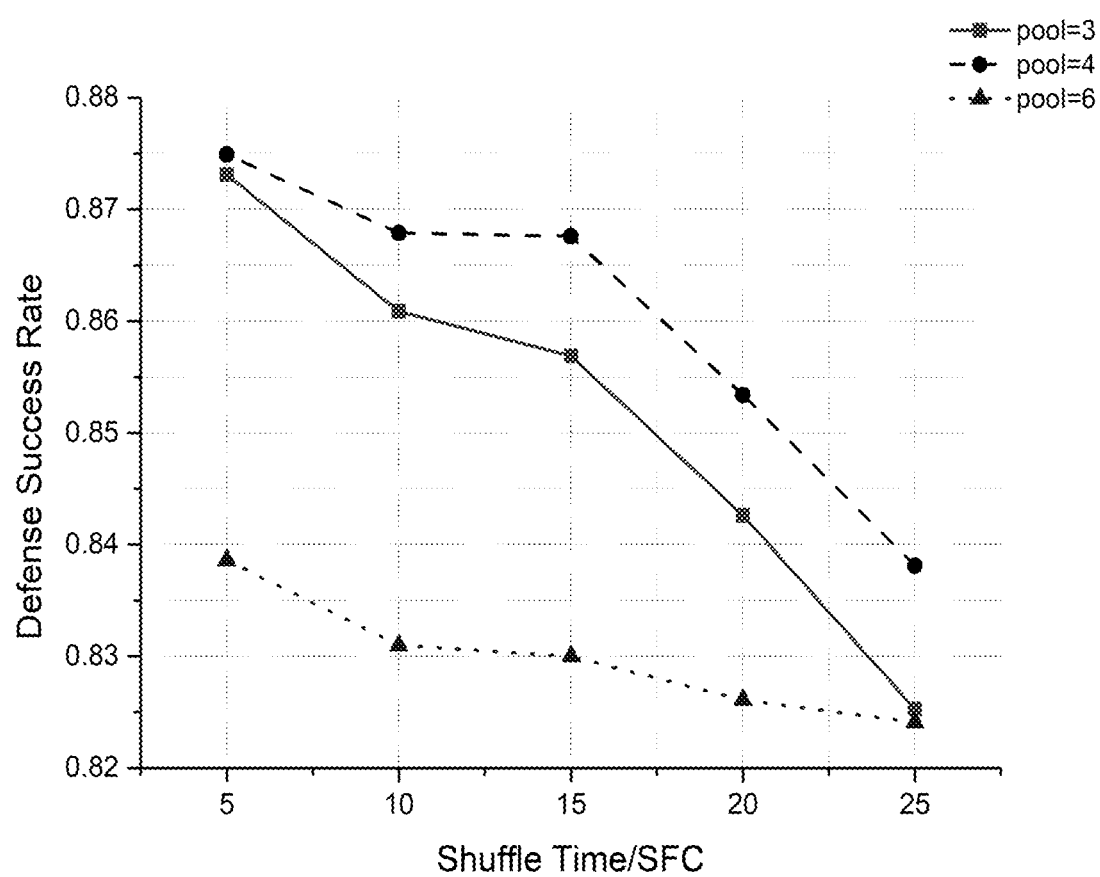
FIG. 6C is a comparison diagram of the defense success rates using the enhanced mode-1 and SeqA at different shuffle times.

In FIG. 6A-C, in the enhanced mode-1, the defense success rates of different numbers of sub-pools using different attack modes when the shuffle time varies from 5 to 25 are compared. It can be determined from these three figures that regardless of how the attack mode varies and how the shuffle time varies, the defense success rate when there are 4 sub-pools is always higher than that when there are 3 or 6 sub-pools. The heterogeneity between VNFs in the same sub-pool is small, while the heterogeneity between VNFs in different sub-pools is large, which is a basis for sub-pool division. FIG. 6A-C shows that for a fixed number of replica VNFs, too large or too small number of sub-pools is not suitable. When the number of sub-pools is relatively large, the heterogeneity between the sub-pools is reduced, so that the heterogeneity between VNFs selected from the different sub-pools is reduced, and thus the defense success rate is reduced; and when the number of the sub-pools is small, some replicas with large heterogeneity may be divided into the same sub-pool, which may cause a decrease in the heterogeneity between VNFs selected from the different sub-pools, thereby decreasing the defense success rate. Also, as RdA has randomness, the resulting defense success rate does not always decrease as the shuffle time increases, but for LpA and SeqA, the resulting defense success rate always decreases as the shuffle time increases.

Figure 7A:
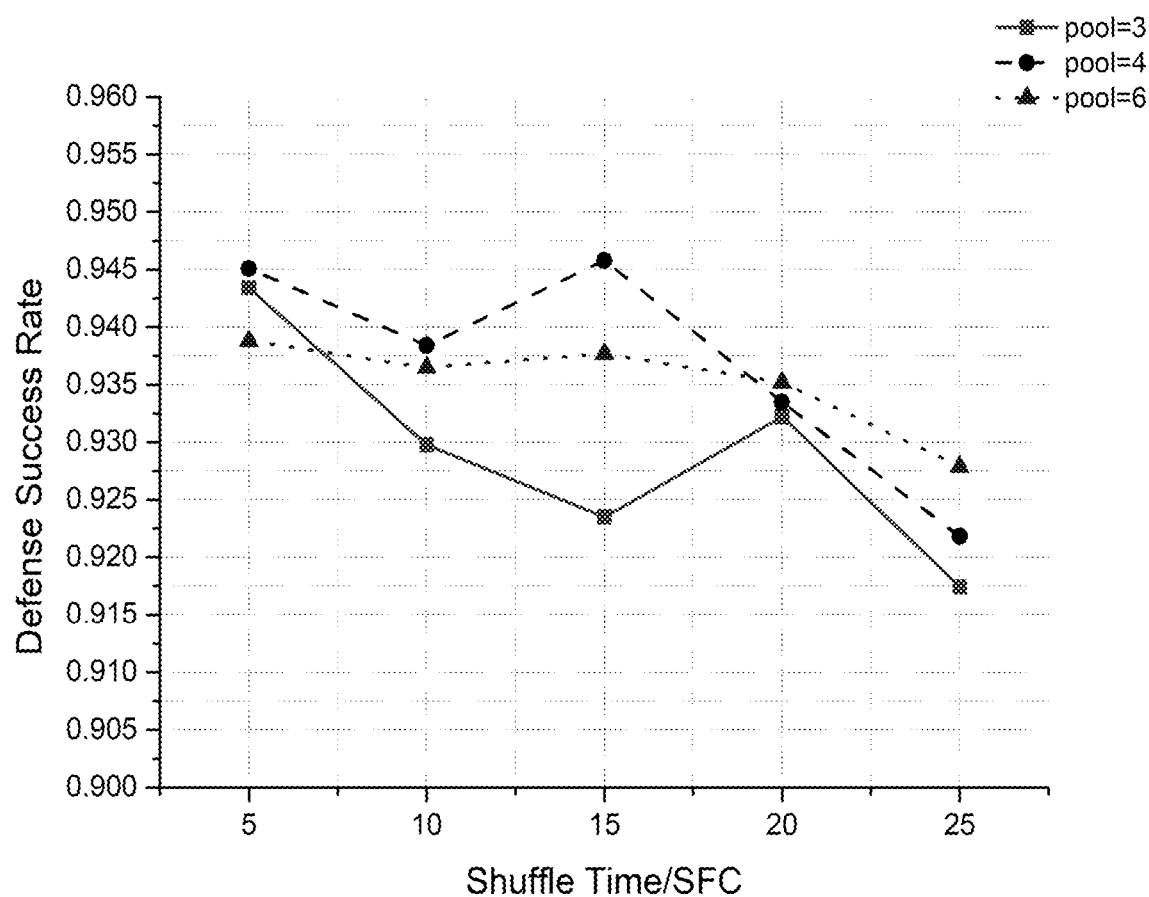
FIG. 7A is a comparison diagram of the defense success rates using the enhanced mode-2 and LpA at different shuffle times.
Figure 7B:
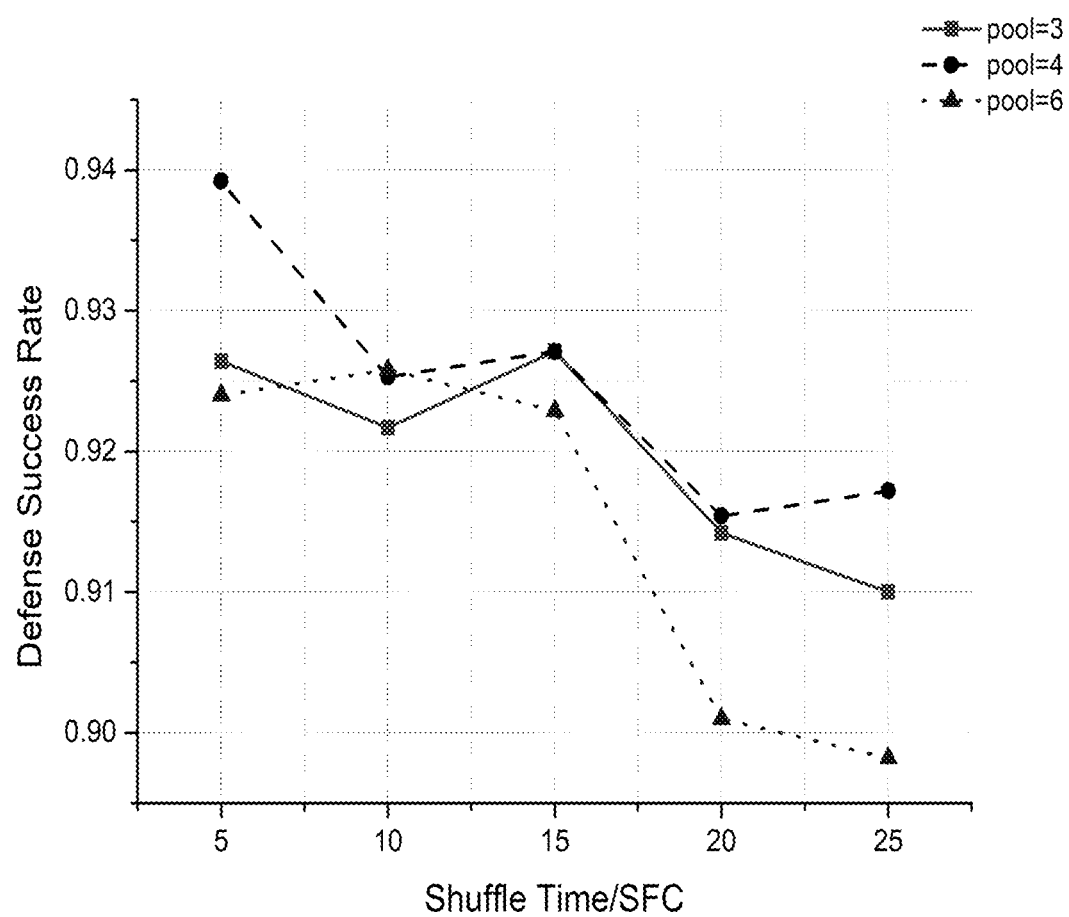
FIG. 7B is a comparison diagram of the defense success rates using the enhanced mode-2 and RdA at different shuffle times.
Figure 7C:
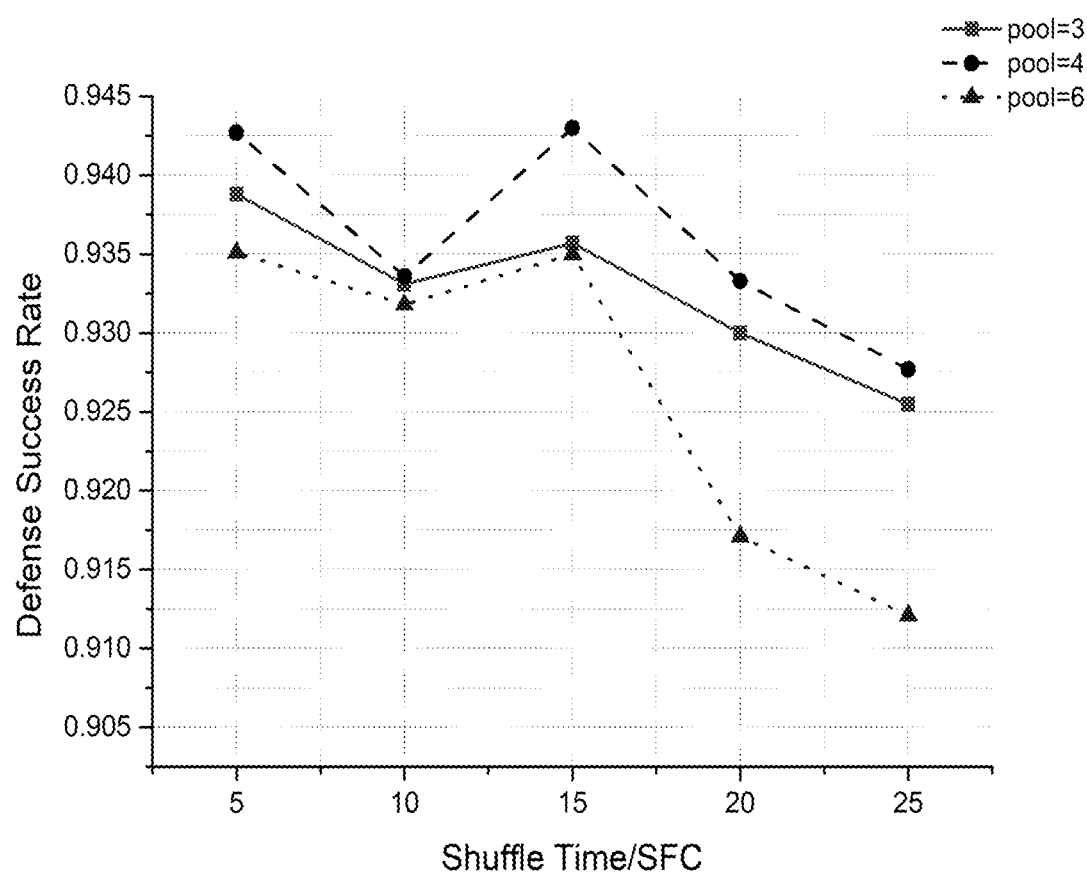
FIG. 7C is a comparison diagram of the defense success rates using the enhanced mode-2 and SeqA at different shuffle times.

FIG. 7A-C shows that the defense success rate is substantially the highest when the number of the sub-pools is 4, and when the number of the sub-pools is 3 or 6, the defense success rate is occasionally greater than that when the number of the sub-pools is 4. This is due to the fact that the enhanced mode-2, as compared with enhanced mode-1, provided by the present invention comprises an additional step of performing maintenance on the basis of a historical information table, which makes the defense success rate when there are 4 sub-pools not necessarily higher than the defense success rate when there are 3 or 6 sub-pools, so that the defense success rate in the enhanced mode-2 is always higher than that in the enhanced mode-1, and the defense success rate in the enhance mode-1, and the defense success rate in the enhanced mode-2 does not always decrease as the shuffle time increases.

What is claimed is:

1. An endogenous dynamic defense architecture-based multi-objective service function chain deployment method, comprising the following steps:
   (1) constructing an endogenous dynamic defense architecture to solve a multi-objective service function chain (SFC) deployment problem, which comprises using a dynamic heterogeneous redundancy (DHR) architecture as a core architecture of mimic defense, wherein the endogenous dynamic defense architecture comprises a basic mode and an enhanced mode,
   the basic mode comprises using moving target defense to guarantee the security of a virtualized network function (VNF), and shuffling the VNF, i.e. when the VNF is generated, dynamically changing an IP address, an execution code and a generation parameter, so that it is difficult for an attacker to perform prediction and attacks;
   the enhanced mode comprises using mimic defense to perform security protection on a VNF, and using a dynamic heterogeneous redundancy architecture for a VNF vulnerable to attacks, so as to achieve the capability of active defense;
   the multi-objective SFC deployment problem is described in detail as follows:
   defining a vulnerability set as $VN=\{vn_z | z \in [1, |VN|]\}$, each VNF vulnerable to attacks containing $\alpha$ vulnerabilities; and defining a heterogeneous replica VNF pool as $FE=\{fe_l | l \in [1, |FE|]\}$, each replica VNF also containing $\alpha$ vulnerabilities;
   an objective function for the SFC deployment problem is as follows:

$$\min(f_1 + f_2 + f_3)$$
$$\text{s.t. } C_1, C_2, C_3$$

$$\begin{cases} f_1 = \sum_{r_\mu \in R} D_\mu \\ f_2 = \sum_{r_\mu \in R} \frac{1}{|A_\mu|} \sum_{a=1}^{|A_\mu|} \frac{q_a}{Q} \\ f_3 = C(\tau) \end{cases}$$

wherein C1, C2, and C3 represent a resource constraint, a bandwidth constraint, and a time delay constraint, respectively;
   for $f_1$, $D_\mu$ is a total response time delay with the expression as follows:

$$D_\mu = L_\mu + P_\mu + T_\mu + W_\mu$$

where $L_\mu = \sum_{e_h^\mu \in E_\mu} \sum_{e_j \in E} x_{e_h^\mu}^{e_j} D_{e_j}$ is a communication time delay, $$P_\mu = \sum_{f_v^\mu \in F_\mu} \sum_{n_i \in N} x_{f_v^\mu}^{n_i} \cdot \frac{1}{\frac{\eta_{m_i}^\mu c_{m_i}}{w_{m_i}^\mu} - \lambda_\mu + \varepsilon}$$

is a processing time delay, $$T_\mu = \sum_{f_v^\mu \in F_\mu} \frac{U}{v_\mu}$$

is a transmission time delay, and $$W_\mu = \sum_{a=1}^{|A_\mu|} \left( \max \frac{V_\mu}{K_{f_\omega}^a} \right) + W_{sh} + W_{sw}$$

is an additional time delay brought by the dynamic defense architecture;
   for $$f_2, \sum_{r_\mu \in R} \frac{1}{|A_\mu|} \sum_{a=1}^{|A_\mu|} \frac{q_a}{Q}$$

is an average defense success rate, where q represents the number of defense successes, and Q represents the total number of attacks;
   for $f_3$, $C(\tau)$ represents total deployment costs with the expression as follows:

$$C(\tau) = C_{operational}(\tau) + C_{replica}(\tau)$$

$C_{operational}(\tau)$ represents total operating costs, which is the sum of starting costs of a server and costs of successfully placing a VNF;

$$C_{operational}(T) = \sum_{n_i \in N} \sum_{f_v^\mu \in F_\mu} x_{f_v^\mu}^{n_i} \zeta_c C_{f_v^\mu} + \sum_{e_j \in E} \sum_{e_h^\mu \in E_\mu} x_{e_h^\mu}^{e_j} \zeta_B B_\mu + \sum_{n_i \in N} \zeta_O$$

$x_{f_v^\mu}^{n_i}$ represents whether a VNF $f_v^\mu \in F_\mu$ is deployed on a server node $n_i \in N$ in a request $r_\mu \in R$, $x_{e_h^\mu}^{e_j}$ represents whether a virtual link $e_h^\mu \in E_\mu$ is mapped onto a physical link $e_j \in E$ in a request $r_\mu \in R$, $\zeta_c$ and $\zeta_B$ respectively represent the unit costs of resources and bandwidths, $C_{f_v^\mu}$ represents a resource requirement of the VNF $f_v^\mu \in F_\mu$, and $\zeta_O$ represents the starting costs of the server;
   $C_{replica}(\tau) = C_{pool}(\tau) + C_{shuffling}(\tau) + C_{switching}(\tau)$ represents additional costs brought about by the endogenous dynamic defense architecture, where $C_{pool}(\tau) = \sum_{f \in FE} \zeta_c C_f$ represents costs of maintaining the heterogeneous replica VNF pool, $$C_{shuffling}(\tau) = \frac{|R|}{x} C_{sh}$$

represents costs of shuffling, and $C_{switching}(\tau) = \sum_{r_\mu \in R} C_{sw}(r_\mu)$ represents costs of switching;
   (2) on the basis of the heterogeneity among replica VNFs, dividing the heterogeneous replica pool FE into different replica sub-pools according to common vulnerabilities, the specific division flow being as follows:
      (21) selecting p VNFs with the maximum degree of heterogeneity with other replica VNFs as initial centers of the sub-pools;
      (22) traversing the heterogeneous replica pool FE, calculating the degree of heterogeneity of a replica VNF i and the p centers of the sub-pools, and allocating i to the sub-pool with the minimum degree of heterogeneity with the replica VNF i;
      (23) updating the centers of the sub-pools, setting the VNFs which have the minimum sum of the degree of heterogeneity of the remaining VNFs in each sub-pool as the centers of the sub-pools, and then repeating the operations of steps (22) and (23), and ending the operation until the centers of the sub-pools do not change or the maximum number of iterations is reached;
(3) on the basis of the degree of heterogeneity of the VNFs and a historical information table, respectively selecting suitable VNFs from the sub-pools to be deployed by means of a replica VNF dynamic scheduling deployment algorithm, the specific process being as follows:
  (31) randomly selecting a VNF from a certain sub-pool and adding same to a heterogeneous replica set AE;
  (32) sequentially traversing the VNFs in the remaining sub-pools, and if an enhanced mode-1 is adopted, selecting a replica with the maximum degree of heterogeneity with other VNFs in the AE and adding same to the AE; if an enhanced mode-2 is adopted, selecting a replica with the maximum degree of heterogeneity with other VNFs in the AE and adding same into the AE in combination with the historical information table;
  (33) traversing the heterogeneous replica set AE, and selecting a part of VNFs according to the degree of heterogeneity and adding same to a deployment set BE;
  (34) if the basic mode is adopted, directly adding the original VNF to the deployment set BE;
  (35) deploying the replica set BE by using a deep reinforcement learning (DRL)-based algorithm, and regularly shuffling the VNFs in the BE, wherein
the replica VNF dynamic scheduling deployment algorithm includes the following three modes:
  1) the basic mode: only using moving target defense (MTD), and only performing regular shuffling on the VNFs without adding extra replicas;
  2) The enhanced mode-1: using MTD and mimic defense to select a plurality of VNFs with equivalent functions according to the heterogeneity, and regularly shuffling the VNFs; and
  3) the enhanced mode-2: using MTD and mimic defense, selecting a plurality of VNFs with equivalent functions according to the heterogeneity, performing dynamic switching according to historical information, and regularly shuffling the VNFs.

2. The endogenous dynamic defense architecture-based multi-objective service function chain deployment method according to claim 1, wherein in step (1), for the enhanced mode, the DHR is used as the core architecture of mimic defense, which is composed of an input module, a processing module, an output module, a construction module and a scheduling module;

the input module is composed of a user input and a service scheduling agent, and after an SDA replicas the user input to obtain n user inputs so as to form n sub-inputs, the SDA distributes the n sub-inputs to the deployment set BE in the processing module;

the processing module is composed of the deployment set BE, and the replica VNFs in the deployment set process the n sub-inputs formed by the input module to form n sub-outputs, and then sends same to a mimic decision point for determination;

the output module is composed of a mimic decision point (MDP) and is used for determining n sub-outputs of the same input message, and if k or more than k results are consistent, then outputting the results, otherwise, stopping outputting;

the construction module comprises a heterogeneous replica pool FE and a heterogeneous replica set AE, divides the heterogeneous replica pool FE into p sub-pools according to a sub-pool division algorithm, and selects a replica from each sub-pool according to a scheduling algorithm, so as to form the heterogeneous replica set AE; and the scheduling module selects n replicas from the heterogeneous replica set AE as the deployment set BE in the processing module according to the scheduling and deployment algorithm, and after a scheduling period, the scheduling module removes the BE, restores same to an initial state by shuffling, and reselects a deployment set for the next scheduling period according to the scheduling and deployment algorithm.

3. The endogenous dynamic defense architecture-based multi-objective service function chain deployment method according to claim 1, wherein step (2) is performed to measure the heterogeneity between different replica VNFs by means of a Jaccard distance, the heterogeneity between a VNF $f_i$ and a VNF $f_j$ being expressed as follows:

$$Dist(\alpha_i, \alpha_j) = 1 - \frac{\|\alpha_i + \alpha_j\|}{|\alpha_i + \alpha_j|}$$

$$\alpha_i = [qvn_{i1}, qvn_{i2}, \ldots, qvn_{i|VN|}]^T,$$

$$\alpha_j = [qvn_{j1}, qvn_{j2}, \ldots, qvn_{j|VN|}]^T$$

where $\alpha_i$ and $\alpha_j$ represent vulnerability vectors of the VNF $f_i$ and the VNF $f_j$, when the VNF $f_i$ has a vulnerability $vn_z$, $qvn_z=1$, otherwise $qvn_z=0$.

* * * * *